United States Patent
Emerick et al.

(10) Patent No.: US 11,164,252 B2
(45) Date of Patent: *Nov. 2, 2021

(54) FUTURES EXCHANGE SUPPORT OF SPOT TRADING

(71) Applicant: Chicago Mercantile Exchange Inc., Chicago, IL (US)

(72) Inventors: David Emerick, Rainham (GB); John Labuszewski, Westmont, IL (US); Will Patrick, London (GB); Sandra Ro, London (GB); Roger Rutherford, Camberley (GB); Steve Youngren, Elgin, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/541,884

(22) Filed: Aug. 15, 2019

(65) Prior Publication Data

US 2019/0370900 A1     Dec. 5, 2019

Related U.S. Application Data

(63) Continuation of application No. 13/613,712, filed on Sep. 13, 2012, now Pat. No. 10,417,707.

(51) Int. Cl.
     *G06Q 40/04*      (2012.01)

(52) U.S. Cl.
     CPC ................. *G06Q 40/04* (2013.01)

(58) Field of Classification Search
     CPC .................................................. G06Q 40/04

USPC .......................................................... 705/37
See application file for complete search history.

(56) References Cited

U.S. PATENT DOCUMENTS

| | | | |
|---|---|---|---|
| 7,152,041 B2 | 12/2006 | Salvadori | |
| 7,512,556 B2 | 3/2009 | Wagner | |
| 8,429,057 B1 * | 4/2013 | Dale .................. | G06Q 40/04 705/37 |
| 2003/0018561 A1 | 1/2003 | Kitchen | |
| 2004/0199450 A1 | 10/2004 | Johnston | |
| 2005/0203826 A1 | 9/2005 | Farrell et al. | |
| 2005/0278234 A1 | 12/2005 | Wagner | |
| 2006/0195386 A1 * | 8/2006 | Glodjo ................. | G06Q 20/10 705/37 |
| 2010/0017321 A1 | 1/2010 | Callaway et al. | |
| 2011/0093378 A1 | 4/2011 | Lane | |
| 2011/0295726 A1 | 12/2011 | Mueller | |
| 2012/0143738 A1 * | 6/2012 | McConnel ............ | G06Q 40/04 705/35 |

\* cited by examiner

*Primary Examiner* — Alexander G Kalinowski
*Assistant Examiner* — Liz P Nguyen
(74) *Attorney, Agent, or Firm* — Lempia Summerfield Katz LLC

(57) ABSTRACT

A computer system associated with spot market trading in a particular subject matter may communicate with a computer system associated with trading in futures contracts or options in futures contracts for the subject matter. The communications may include pricing data for at least one of futures contracts or options in futures contracts for the subject matter, which pricing data may be used for spot market pricing. The communications may also include communications regarding futures hedging of spot trading in the subject matter.

18 Claims, 6 Drawing Sheets

FUTURES EXCHANGE SUPPORT OF SPOT TRADING

CROSS-REFERENCE TO RELATED APPLICATION

This application is a continuation under 37 C.F.R. § 1.53(b) of U.S. patent application Ser. No. 13/613,712, filed Sep. 13, 2012 (Attorney Docket No. 4672/12283Z), the entire disclosure of which is hereby incorporated by reference and relied upon.

BACKGROUND

Futures contracts and options on futures contracts can be distributed or executed through a variety of means. Historically, futures were largely executed or transacted on the floor of an exchange in so-called "trading pits" that facilitated physical interaction between floor brokers and floor traders. This method is commonly known as "open outcry." Although some open outcry trading still occurs, most futures contracts and options are now transacted through electronic trading systems. One example of such a system is the Chicago Mercantile Exchange GLOBEX electronic trading platform. The GLOBEX system and other electronic trading systems allow customers (e.g., parties wishing to transact in futures contracts and/or options) to establish an electronic link to an electronic matching engine of a futures exchange. That engine, which may be a computer system or a part of a larger computer system, identifies orders that match in terms of commodity, quantity and price.

Submission and processing of customer orders for exchange-traded futures and/or options are facilitated by a variety of entities known as "channel partners" of the exchange. Channel partners can include futures brokers, clearing members (CMs) and independent software vendors (ISVs). Customers, including retail and institutional traders, will typically open or establish futures accounts with futures brokers. In the United States, such brokers are also known as "futures commission merchants" (FCMs). FCMs are licensed by governmental authorities to solicit and accept customer orders for entry into exchange market mechanisms. FCMs may further establish relationships with exchange CMs to facilitate the financial standing of a transaction. In particular, only CMs interact directly with an exchange clearing house. The exchange clearing house stands as buyer to every seller and seller to every buyer, for purposes of attaching certain financial safeguards to each transaction. A CM essentially guarantees the financial integrity of an FCM's transactions, and thus the integrity of customer transactions through that FCM, to the clearing house. In many cases, an FCM may also be a CM, or the FCM and CM may be related corporate entities.

Although FCMs and CMs may act as financial intermediaries between the exchange clearing house and the customer, an FCM need not actually handle orders as a customer places those orders electronically. Many exchanges, including CME Group, adhere to a direct access policy such that customers may enter their orders directly into the exchange matching engine. So that a customer can obtain that direct access, however, the FCM and CM may effectively sponsor the customer by financially guaranteeing customer trading activity to the exchange clearing house. Moreover, a customer order destined for the exchange electronic trading platform may be initially received by an electronic platform operated by the FCM. The electronic platform operated by the FCM (or another platform operated by a CM associated with the FCM) may then transmit the customer order to the matching engine of an exchange (or to matching engines of multiple exchanges). In some cases, an electronic platform operated by an FCM or CM is a proprietary routing system developed by the FCM or CM. However, many FCMs and CMs utilize services of ISVs. Those ISVs provide routing systems on a fee basis, usually featuring functionalities designed to facilitate trading activity. In many cases, an FCM and/or a CM will insert credit controls into a routing system to limit customer activities within certain defined parameters as a risk containment measure. For example, an FCM might configure its platform to allow a customer to directly communicate orders to the exchange via the FCM platform as long as various conditions (e.g., a valid account, sufficient margin, etc.) are satisfied.

After an electronic matching engine or other trading platform of an exchange matches a customer order received via an FCM, the executed order (or "fill") is reported back to the customer. The transaction may further be reported to the exchange clearing house. The clearing house generates bookkeeping reports that are transmitted to the CM and/or FCM representing the customer. The FCM or CM may provide the customer with periodic financial reports regarding the customer's account activity.

The underlying subject of a futures contract is sometimes referred to as the "spot" or the "cash" commodity or instrument. Examples of such subject matters include, without limitation, commodities (e.g., agricultural commodities, energy commodities, metals), foreign currencies, debt obligations, and securities. In addition to a market for futures contracts and futures contract options provided by an exchange, there may also be a "spot market" for subject matter that underlies futures contracts and futures contract options. In a spot market, a commodity, currency, debt obligation, security or other subject matter is bought and sold for cash and delivered immediately. By contrast, a futures contract is an agreement to deliver a particular subject matter (or its cash value) on some future date for an agreed price.

Futures tend to be very liquid. In many cases, a market for futures in an underlying spot may be more liquid that the spot market. Because of this, economic information can be conveyed by a futures price. Indeed, spot transactions are sometimes priced by reference to futures activity. And while futures may generally be quite liquid, there remain many customers who might prefer to trade in a spot market rather than futures transactions for the spot. For example, institutional and retail customers actively trade foreign currencies in spot foreign exchange (FX) markets.

Spot FX dealers may quote both a bid (to buy) and an offer (to sell) a specific currency pairing, e.g., Euros (EUR) vs. U.S. dollars (USD). Typically, such a dealer will quote a bid to buy which is somewhat less than the offer to sell and hope to profit by buying at (low) bids, selling at (relatively higher) offers and maintaining a balanced book with little or no net risk exposure. The difference or width of the bid-offer spread may represent profit to the dealer.

A spot FX dealer may price bids and offers by reference to futures prices adjusted by "forward points." Forward points, sometimes referred to as "cost of carry," generally reflect the difference between interest rates prevailing in the two currencies represented in the currency pairing, e.g., the difference between U.S. short-term interest rates and Euro denominated short-term interest rates. Forward points are based on the theory that buying currency A (e.g., EUR) with currency B (e.g., USD) provides the opportunity to invest currency A at prevailing currency A rates but foregoes the opportunity to invest currency B at prevailing currency B rates. Thus, the future or forward value of a currency pairing is generally dictated by the difference between prevailing interest rates in the two countries or regions whose currencies are represented in the pairing.

Sometimes, a customer submitting orders for futures contracts and/or futures contract options may be a dealer in the spot market for the underlying subject matter of such futures contracts or options. For example, an FX dealer that buys and sells a particular foreign currency may wish to trade in futures contracts and/or futures contract options concerning that foreign currency. A spot dealer may deal in such futures contracts and/or futures contracts as a way to hedge or lay-off risk associated with any unbalanced currency positions in spot market holdings. For example, an FX dealer in the spot market may have a net long EUR/USD position as a result of a transaction with a customer, or a series of transactions with multiple customers. To hedge the risk of being long in EUR (i.e., the risk associated with holding EUR instead of USD), the dealer may in turn go short (i.e., sell) in EUR/USD futures. Because the short futures position provides the dealer with a mechanism to obtain a known USD value for a known quantity of EUR on a future date (i.e., the maturity date of the sold futures contract), the dealer's long spot position is economically offset or balanced with an opposite short futures position.

SUMMARY

This Summary is provided to introduce a selection of concepts in a simplified form that are further described below in the Detailed Description. This Summary is not intended to identify key or essential features of the invention.

In at least some embodiments, a computer system associated with spot market trading in a particular subject matter may communicate with a computer system associated with trading in futures contracts or options in futures contracts for the subject matter. The communications may include pricing data for at least one of futures contracts or options in futures contracts for the subject matter, which pricing data may be used for spot market pricing. The communications may also include communications regarding futures hedging of spot trading in the subject matter.

In some embodiments, a computer system may receive data indicating a pending spot market transaction for a particular subject matter. The computer system may access data that identifies a limit associated with spot trading in the subject matter. The limit may be a size limit for individual transactions, a size limit associated with a net long position in the spot market for the subject matter or a size limit associated with a net short position in the spot market for the subject matter. The computer system may then determine whether completion of the pending spot market transaction will exceed the limit. The computer system may also access data identifying a futures hedging position corresponding to the limit. The hedging position may include entry into at least one of futures contracts or options in futures contracts for the subject matter. As a result of determining that completion of the pending spot market transaction will exceed the limit, the computer system may identify one or more futures transactions that will create the hedging position. The computer system may then generate and transmit one or more orders associated with the identified one or more futures transactions.

Embodiments include, without limitation, methods for spot trading, methods for support of spot trading by an exchange trading in futures contracts and/or futures contract options, computer systems configured to perform such methods, and computer-readable media storing instructions that, when executed, cause a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Various embodiments may comprise a method, a computer system, and/or a computer program product. Accordingly, one or more aspects of one or more of such embodiments may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of non-transitory computer readable storage media such as hard disks, CD-ROMs, optical storage devices, magnetic storage devices, and/or any combination thereof. The term "computer-readable medium" or "computer-readable storage medium" could also include an integrated circuit or other device having hard-coded instructions (e.g., logic gates) that configure the device to perform one or more operations.

Aspects of method steps described in connection with one or more embodiments may be executed on one or more processors associated with a computer system (such as exchange computer system 100 and/or other computers described below). As used herein, a "computer system" could be a single computer or could comprise multiple computers. When a computer system comprising multiple computers performs a method, various steps could be performed by different ones of those multiple computers. Processors of a computer system may execute computer-executable instructions stored on non-transitory computer-readable media. Embodiments may also be practiced in a computer system forming a distributed computing environment, with tasks performed by remote processing devices that are linked through a communications network. In a distributed computing environment, program modules may be located in both local and remote computer storage media including memory storage devices.

Figure 1:
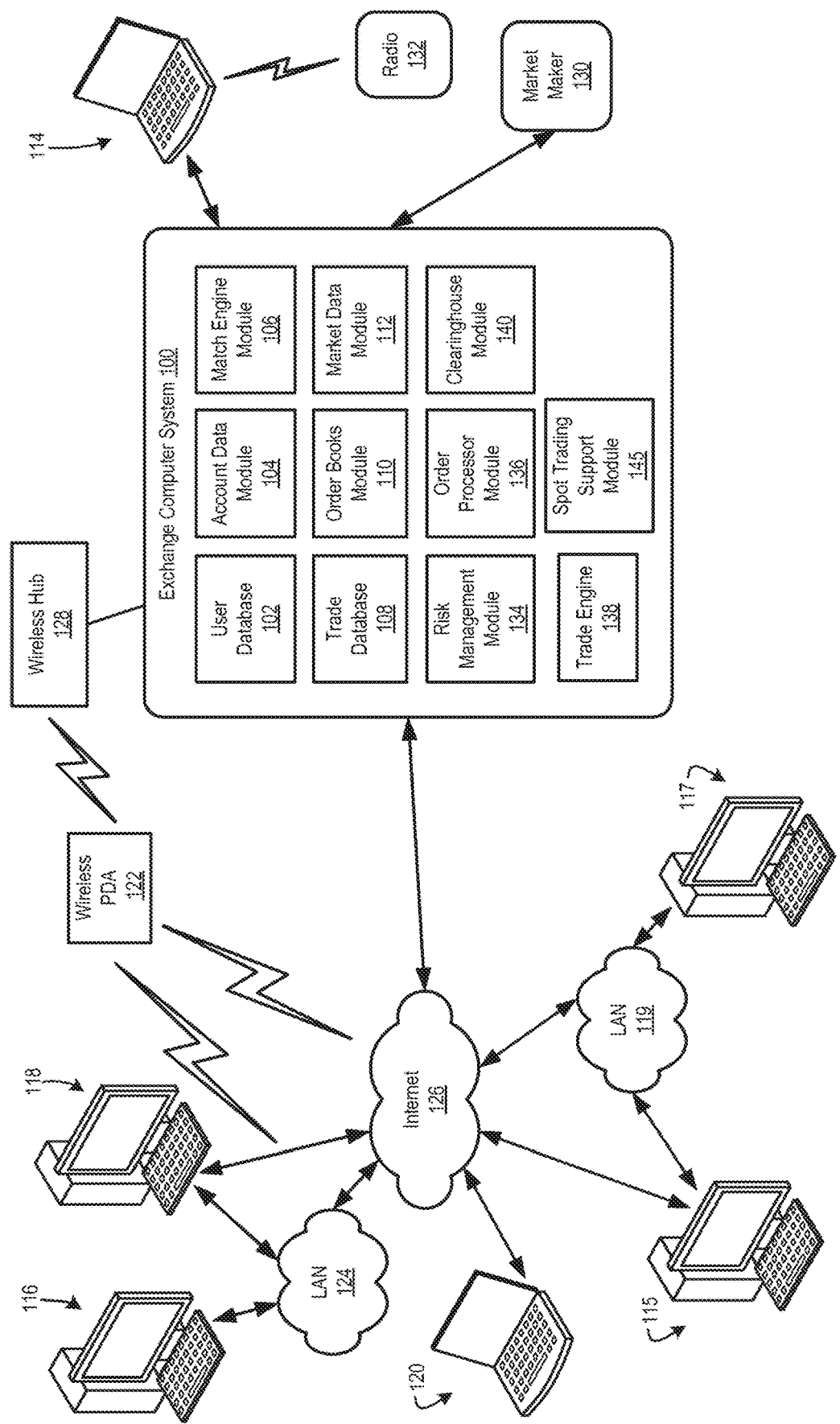
FIG. 1 shows an exemplary trading network environment for implementing trading systems and methods according to at least some embodiments.

Exemplary Operating Environment. Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods that facilitate spot market trading as are discussed in more detail below.

Computer system 100 can be operated by a financial exchange and configured to perform operations of the exchange for, e.g., trading in various exchange products. Products of the financial exchange may include, without limitation, futures contracts, options on futures contracts ("futures contract options"), and other types of derivative contracts. Computer system 100 receives orders for exchange products, matches orders to execute trades, transmits market data related to orders and trades to users, and performs other operations associated with a financial exchange. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processing module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from trade database 108 regarding trades of futures contracts and other financial products and facilitate the financial exchange acting as one of the parties to every traded contract or other product. For example, computer system 100 may match an offer by party A to sell an exchange product with a bid by party B to purchase a like exchange product. Module 140 may then create an exchange product between party A and the financial exchange and an offsetting second exchange product between the financial exchange and party B. Module 140 may also be configured to perform other clearinghouse operations. As another example, module 140 may maintain margin accounts for clearing members. In those accounts, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc.

A spot trading support module 145 may also be included in computer system 100. Module 145 may interface with other modules of exchange computer system 100, and with modules of other computer systems external to exchange computer system 100 (e.g., computers 115, 117, 116, 118 and/or 120), to perform various data collection, calculation and other operations associated with support of spot trading. Examples of such operations are discussed below.

Each of modules 102 through 145 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-145).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. Computer devices 115 and 117 are coupled to a LAN 119. Each of LANs 119 and 124 may have one or more of the well-known LAN topologies and may use a variety of different protocols, such as Ethernet. Computers 116 and 118 may communicate with each other and other computers and devices connected to LAN 124. Computers 115 and 117 may communicate with each other and other computers and devices connected to LAN 129. Computers and other devices may be connected to LANs 119 and 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LANs 119 and 124 connected to the Internet 126. Each of LANs 119 and 124 may include a router to connect LANs 119 and 124 to the Internet 126. Computer device 120 is shown connected directly to the Internet 126. The connection may be via a modem, DSL line, satellite dish or any other device for connecting a computer device to the Internet. Computers 115, 117, 116, 118 and 120 may communicate with each other via the Internet 126, LAN 119 and/or LAN 124. For example, and as discussed in below, computer 120 may be associated with a customer wishing to buy or sell in a spot market. Computers 115 and 117 may be associated with a spot market dealer. Computers 116 and 118 might be associated with an FCM and/or CM.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on non-transitory computer-readable media. For example, and as discussed below, computer devices 115 and/or 116 may include computer-executable instructions for performing spot market trading and communicating with exchange computer system 100 via computer 116 and/or computer 118. Computer 116 and/or computer 118 may include computer-executable instructions for receiving orders and communications from a spot dealer (and/or other customers) and routing those communications to exchange computer system 100. In another example, one or more of computer devices 114, 116, 118, 115, 117 and 120 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments. In at least some embodiments, spot trading support module 145 of exchange computer system 100 supports trading by spot market dealers and integrates exchange computer system 100 with a spot trading engine operated by a spot market dealer. For example, module 145 may provide futures pricing information to a spot trading engine for use in pricing spot bids and offers. Module 145 may receive information from the spot trading engine regarding spot dealer hedging requirements and limits associated with spot trading in a particular subject matter, and may use that information to execute hedging transactions and/or prevent further spot transactions until appropriate hedging can take place. Other operations performed by module 145 and/or by a spot trading engine according to some embodiments are discussed below.

Figure 2:
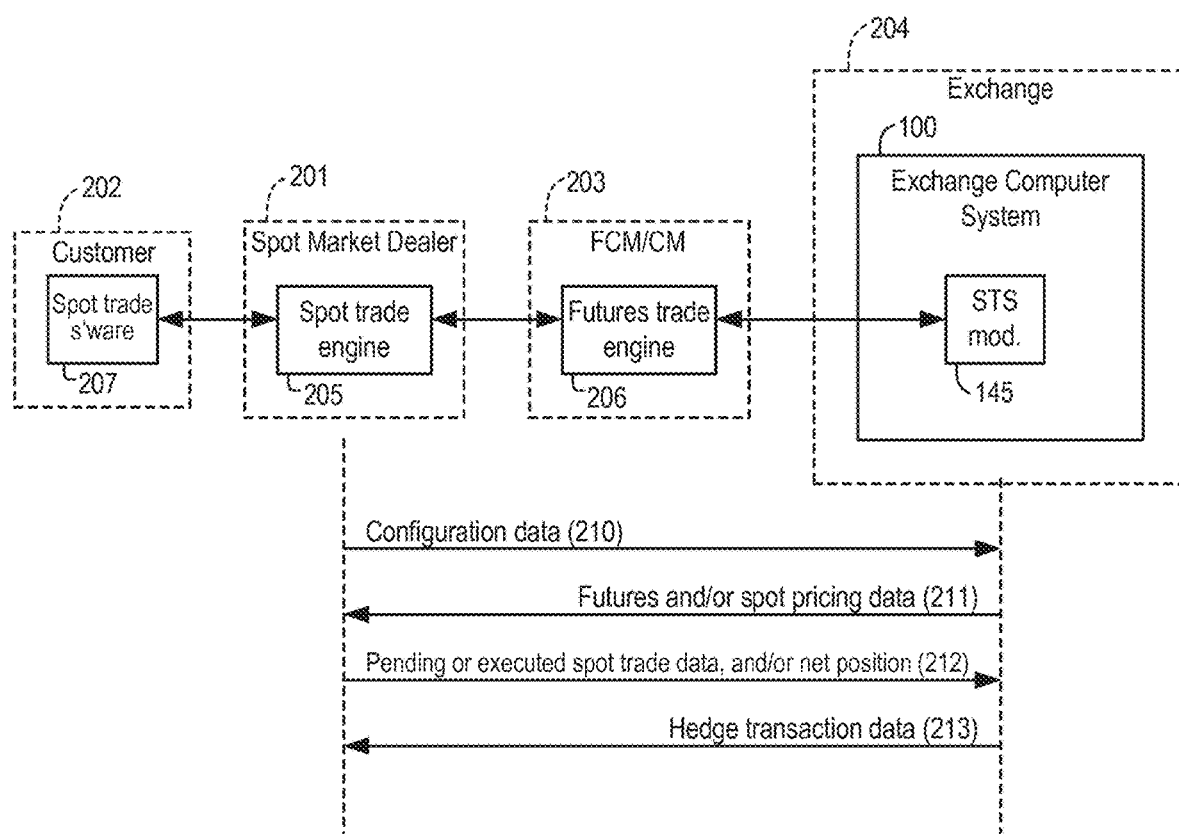
FIG. 2 is a block diagram showing integration of an exchange computer system with a spot trading engine according to some embodiments.

FIG. 2 is a block diagram showing integration of exchange computer system 100 with a spot trading engine according to some embodiments. For convenience, FIG. 2 and subsequent figures will be described using an example of a spot foreign exchange dealer. Other embodiments include spot market dealers in other types of subject matter, however.

FIG. 2 shows a spot market dealer 201, a spot market customer 202, a futures commission merchant 203, and a futures exchange 204. Exchange 204 trades in futures contracts and futures contract options and operates exchange computer system 100. Dealer 201 trades foreign currencies in the spot market. In particular, dealer 201 buys foreign currencies in the spot market from, and sells foreign currencies in that spot market to, customers such a customer 202. For example, dealer 201 may bid to buy or offer to sell a specific quantity of currency A (e.g., Euros or Yen) in return for a specific quantity of currency B (e.g., U.S. dollars). If the bid or offer is accepted, the exchange of currency A for currency B may occur immediately or otherwise in a short amount of time.

Dealer 201 may be associated with one or more computer systems (e.g., computers 115 and 117 of FIG. 1). The dealer computer system(s) execute a spot trading engine 205. Engine 205, which may take the form of one or more computer programs, may receive spot bids and offers from and send spot bids and offers to customers (e.g., customer 202). Engine 205 may also compute bid and offer prices, execute spot market trades, maintain and access data regarding current positions of dealer 201 in spot markets for different foreign currencies, determine whether a spot market position is appropriately hedged, and perform other operations. Customer 202 may be associated with a computer (e.g., computer 120 of FIG. 1) that executes spot trading software 207. Software 207 communicates with spot trade engine 205 and may be used by customer 207 to buy and sell in the spot market.

Dealer 201 is a customer of, and has an account with, FCM 203. In the current example, FCM 203 is also a clearing member (CM) of a clearinghouse associated with exchange 204. If FCM 203 were not a CM, communications between FCM 203 and exchange 204 might be routed through a separate CM. FCM 203 may be associated with one or more computers (e.g., computers 116 and 118 in FIG. 1) that execute a futures trade engine 206. Engine 206, which may take the form of one or more computer programs, allows customers of FCM 203 to communicate with exchange 204. Futures trade engine 206 may perform some data processing in connection with communications between its customers (e.g., dealer 201) and exchange 204. For example, FCM 203 may receive incoming communications, determine that a communication is from a customer with a valid account, determine that the customer account is in good standing (e.g., that an appropriate margin account balance is in place), reformat data in accordance with requirements of exchange computer system 100, determine where to route customer data (e.g., if FCM 203 is associated with multiple exchanges), etc. From the perspective of dealer 201 and other customers of FCM 203, however, communications with exchange 204 via FCM 203 may appear as direct communications with exchange 204.

FIG. 2 also indicates various categories of data that might be communicated between spot trade engine 205 and spot trading support (STS) module 145 according to some embodiments. The left-to-right arrows connecting the vertical line under engine 205 with the vertical line under module 145 indicate types of information that flow from engine 205 to module 145. The right-to-left arrows indicate types of information that flow from module 145 to engine 205. The ordering of these arrows in FIG. 2 is not necessarily indicative of the temporal order in which information of the indicated types might flow or the frequency with which such information might flow.

One type of information that flows from spot trade engine 205 to module 145 is configuration data (arrow 210). This information may include, for each type of subject matter (i.e., spot) in which dealer 201 trades, data requirements, limits associated with spot trading, and hedging instructions. The data requirements may specify what type of futures pricing data dealer wishes to receive. Futures pricing data is discussed below. The limit instructions might include position limits for the subject matter. For example, the dealer may determine that it will hedge with futures contracts and/or futures contract options if the dealer's net long position in the subject matter spot market exceeds a certain value or if its net short position exceeds a certain value. The dealer might also or alternatively determine that hedging is required before executing any single spot transaction over a certain value.

The hedging instructions may include information regarding how the dealer wishes to hedge, e.g., a futures hedging position that the dealer wishes to achieve if (or before) a particular spot trading limit is reached. A hedging position could include one or more futures contracts, one or more futures contract options, and/or combinations of futures contracts and futures contract options. For instance, the dealer may determine that it wishes to hedge a net long spot market position in the subject matter by taking short positions in futures of the subject matter totaling a designated percentage of the dealer's net long spot market position. The hedging instructions may include that designated percentage. The hedging instructions may further indicate how the dealer wishes to hedge. The dealer may, for example, wish to hedge with futures contracts of a specified duration that are priced in a specified manner. The specified manner could be based on current trade prices for the futures contracts of the specified duration, based on a number forward points relative to current prices for the futures contracts of the specified duration, or in some other manner. The hedging instructions might specify that the dealer wishes to hedge using contracts with a mix of durations. In some embodiments, the hedging instructions might not specify the duration of hedging contracts, and instead simply provide a number of basis points. Module 145 could then use that basis point value and the current value of the dealer's net spot market position (which current value could be supplied by the dealer or calculated by engine 145) to select appropriate hedging contracts that result in a hedged futures position that differs from the current value of the dealer's net spot market position by the specified number of forward points.

The above hedging instructions are only examples. There are many ways in which a dealer could instruct module 145 to hedge. The dealer's hedging instructions (and corresponding desired hedging position) for a net long spot market position limit in a particular subject matter could be different from its hedging instructions (and corresponding desired hedging position) for a net short spot market position limit in that same subject matter. The instructions could be tiered, i.e., a first desired hedging position for a net spot position up to a first value, a second desired hedging position for the value of a net spot position over the first value and up to a second value, etc. A dealer might wish to hedge individual large spot market transactions in a manner different from the manner in which net spot market positions are hedged.

Numerous other types of hedging (and concomitant hedging instructions) could be used. As indicated above, the dealer could provide separate limits and hedging instructions for each type of subject matter in which the dealer trades. Configuration data could be updated by engine 205 on a periodic basis.

One type of information that flows from module 145 to engine 205 includes futures pricing data (arrow 211). Engine 205 may use futures pricing data to calculate spot market bid and offer prices that engine 205 provides to spot trade software 207 and to similar software associated with other customers. Futures pricing data may include, for each subject matter in which dealer 201 trades on the spot market, recent trade prices for futures contracts of one or more designated durations, recent trade prices for options in futures contracts of one or more designated durations, and/or other data that dealer 201 may specify in configuration information. Module 145 may send updated futures pricing data at relatively frequent intervals.

In some embodiments, module 145 may also calculate spot market bid and offer prices for dealer 201. For example, configuration data provided by dealer 201 to engine 145 could identify the futures contract(s) that the dealer uses to calculate spot market bid and offer prices, include the number of forward points that the dealer applies to calculate those prices, and could include other data or algorithms used by the dealer to calculate those prices. In such embodiments, futures pricing data 211 might instead (or also) include spot market prices.

Engine 205 may also send data to engine 145 regarding pending or executed spot trades (arrow 212). As explained in more detail below, module 145 may use this data to calculate a net spot market position of dealer 201 in a particular subject matter. Module 145 may then use this net position to determine if hedging is required. In some embodiments, engine 205 may alternatively provide the dealer's net spot market position to module 145 instead of data regarding individual trades. In some embodiments, engine 205 may provide both net position and trade data.

Module 145 may provide engine 205 with hedge transaction data (arrow 213). Such data may include confirmation that a desired hedging position has been created and the details of executed hedge transactions. Hedge transaction data could also include data indicating that desired hedging has not been performed, e.g., if hedging contracts according to the dealer's configuration requirements could not be entered.

Figure 3:
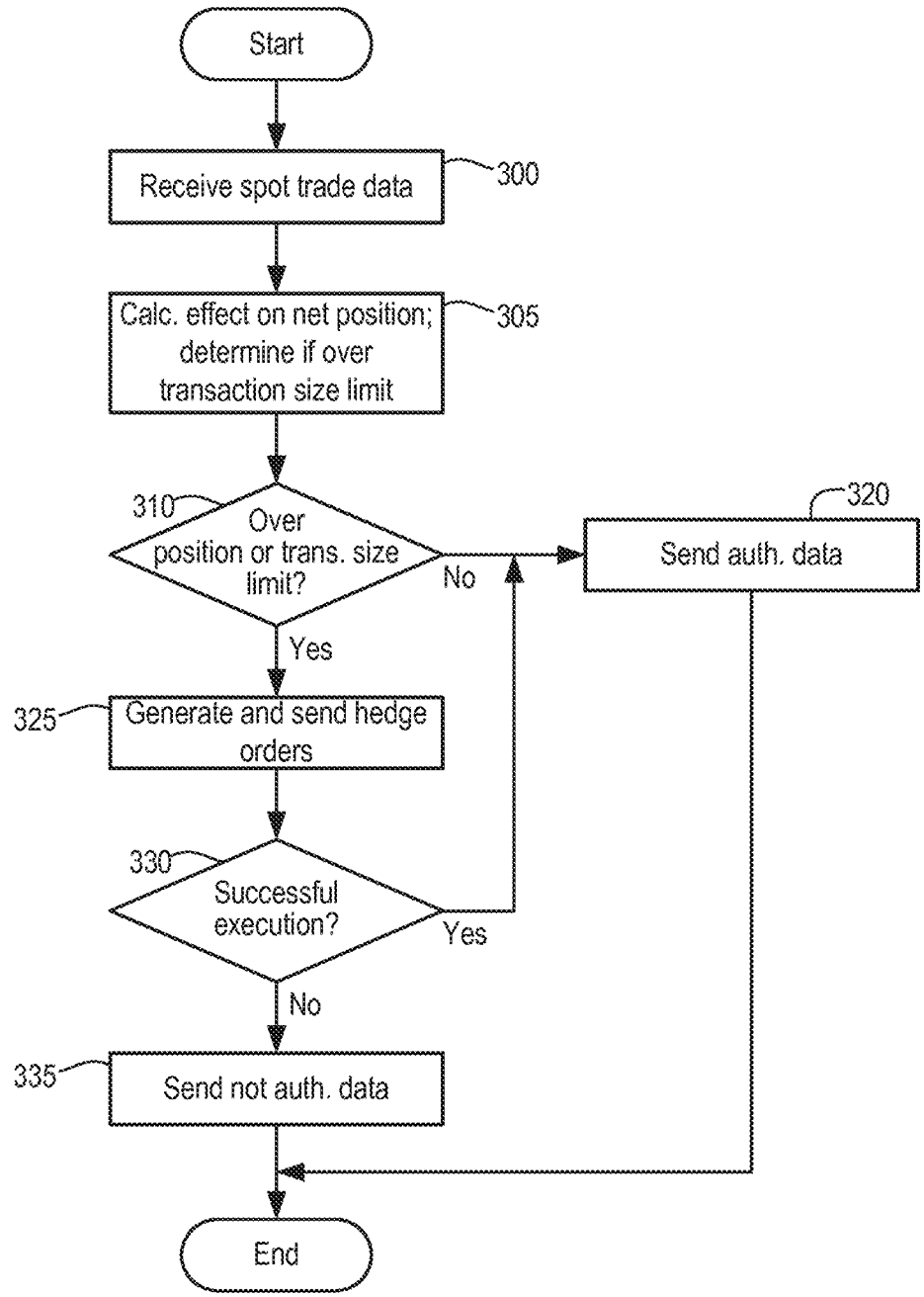
FIG. 3 is a flow chart showing operations performed by a spot trading support module of an exchange computer system according to some embodiments.

FIG. 3 is a flow chart showing operations in a method performed by spot trading support module 145 of exchange computer system 100, according to some embodiments, in support of spot trading by dealer 201. The flow chart of FIG. 3 shows operations performed by module 145 in connection with a particular type of subject matter. In the example of FIG. 3, that subject matter is a particular foreign currency (currency A). Module 145 may separately perform the operations of FIG. 3 for each of multiple types of subject matter traded by dealer 201 on the spot market. Module 145 could perform separate instances of the method indicated by FIG. 3 in separate program threads.

Module 145 may also execute, for each subject matter traded by dealer 201 on the spot market, a separate program thread to receive and store configuration data, updated configuration data, and executed spot trade data. In one of those threads, module 145 periodically receives and stores currency A configuration data that may include data requirements, limits and hedging instructions associated with currency A. That stored currency A configuration data may then be accessed by module 145 when performing operations indicated in FIG. 3. In that same thread (or in another thread), module 145 may periodically receive data from engine 205 indicating that authorized currency A spot market transactions have been completed. Transaction authorization is discussed below. Engine 145 may store that completed transaction data and use it to calculate (and store) a value for the net spot market position of dealer 201 in currency A. That stored net position data may then also be accessed by module 145 when performing operations indicated in FIG. 3.

In step 300, module 145 receives spot trade data from engine 205 indicating that there is a pending spot market transaction for currency A and requesting permission to complete that transaction. As explained in connection with FIG. 4, engine 205 may have received a communication from software 207 indicating that customer 202 wishes to accept a bid or offer posted by spot trade engine 205. As a result, engine 205 transmitted the trade data communication received in step 300.

In step 305, module 145 analyzes the received spot trade data and determines if the pending spot market transaction will exceed a limit. Module 145 may first determine if the pending spot market transaction will exceed a limit for individual transactions that dealer 201 specified in it currency A configuration data. If so, hedging may be required. Module 145 also determines the effect of the pending spot market transaction on the net position of dealer 201 in the currency A spot market. If completion of that pending transaction will cause dealer A to have a net long position above a net long limit specified in the currency A configuration data or have a net short position above a net short limit also specified in the currency A configuration data, hedging may be required.

Module 145 then proceeds to step 310. If module 145 determined in step 305 that the pending spot market transaction will not result in a net long position above the net long limit or a net short position above the net short limit, and that the transaction will not exceed the individual transaction size limit, module 145 proceeds to block 320 on the "no" branch. In block 320, module 145 sends data to engine 205 that authorizes completion of the pending spot market transaction. Module 145 then proceeds from step 320 to the end of the method.

If module 145 had determined in step 305 that the pending spot market transaction will result in a net long position above the net long limit or a net short position above the net short limit, or that the transaction will exceed the individual transaction size limit, module 145 would instead proceed on the "yes" branch from step 310 to step 325. In step 325, module 145 accesses the hedging instructions in the currency A configuration data and identifies one or more currency A futures contracts and/or futures contract options that will result in the hedging position specified in the configuration data. Module 145 then generates orders for one or more appropriate futures contracts and/or futures contract options and sends those orders to other modules of exchange computer system 100 to execute one or more appropriate hedge transactions.

Module 145 then proceeds to step 330 and determines if the instructions sent in step 330 resulted in successful execution of the needed transactions. If so, module 345 proceeds to step 320 on the "yes" branch from block 330 and sends authorization data to engine 205. If module 145 reaches block 320 from block 330, module 145 may also include details of the executed hedge transactions with the authorization data.

If in step 330 module 145 determines that the needed hedge transactions could not be completed (e.g., because match engine module 106 could not match orders sent in step 325 within a predetermined time), module 145 proceeds on the "no" branch to step 335. In step 335, module 335 sends data to engine 205 indicating the pending spot market transaction is not authorized. The method then ends.

Figure 4:
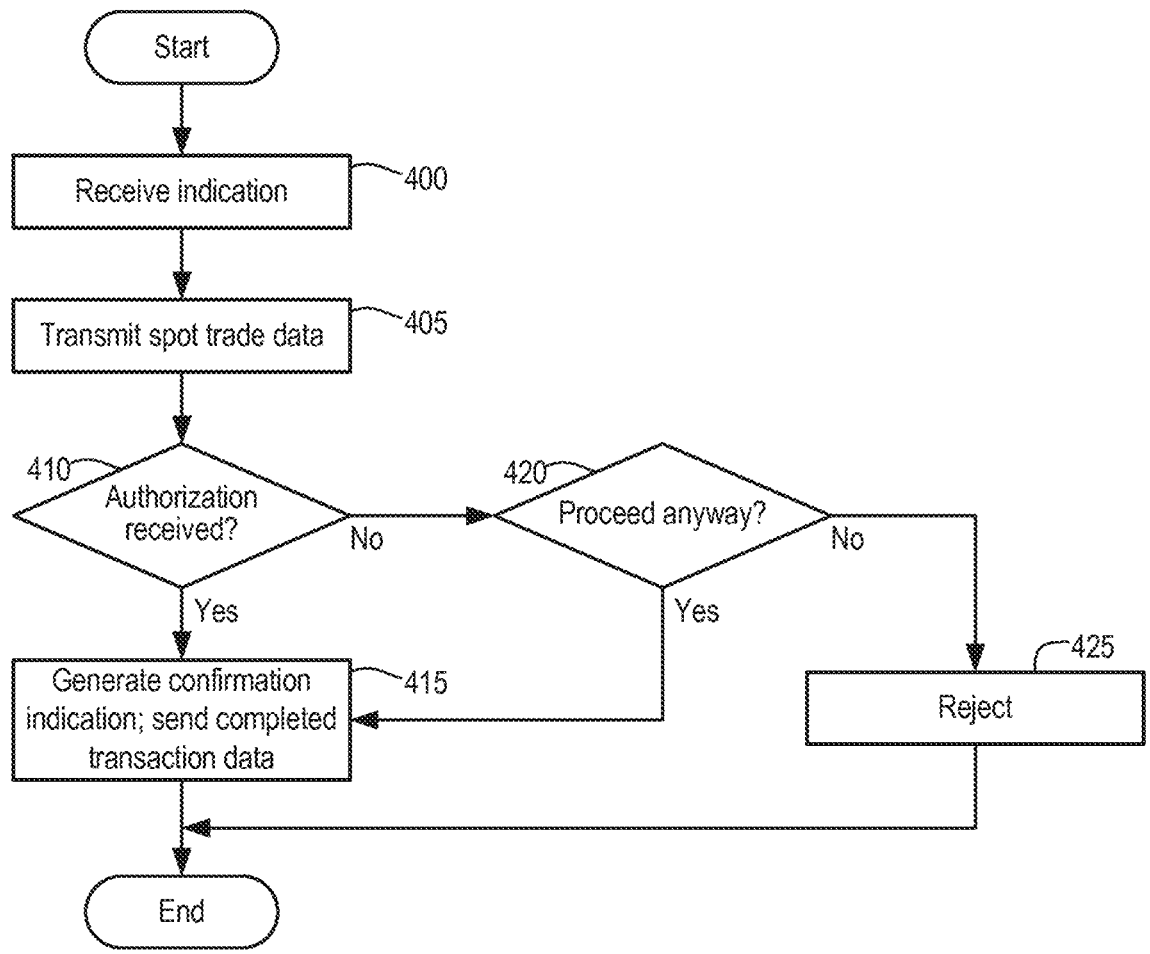
FIG. 4 is a flow chart showing operations performed by a spot trading engine according to some embodiments.

FIG. 4 is a flow chart showing operations in a method performed by spot trading engine 205, according to some embodiments, as part of spot trading by dealer 201. The flow chart of FIG. 4 shows operations performed by engine 205 in connection with a particular type of subject matter. In the example of FIG. 4, that subject matter is currency A. Engine 205 may separately perform the operations of FIG. 4 for each of multiple types of subject matter traded by dealer 201 on the spot market. Engine 205 could perform separate instances of the method indicated by FIG. 4 in separate program threads.

Engine 205 may also execute, for each subject matter traded by dealer 201 on the spot market, a separate program thread to generate, transmit and store configuration and updated configuration data. In one of those threads, engine 205 receives input from a user of engine 205 indicating initial and/or updated configuration data that may include data requirements, limits and hedging instructions associated with currency A. In response to that input, engine 205 generates configuration data and/or configuration data updates, transmits that data to module 145, and stores that data locally for use by engine 205. Engine 205 may then access that stored currency A configuration data when performing operations indicated in FIG. 4. In that same thread (or in another thread), engine 205 may track completed spot market transactions in currency A and determine the net spot market position of dealer A in currency A. Stored net position data may then also be accessed by engine 205 when performing operations indicated in FIG. 4. In that thread (or in yet another thread), engine 205 may automatically calculate currency A spot market bid and offer prices based on futures data received from engine 145. In some embodiments, module 145 may calculate spot market bid and offer prices for currency A using forward points and/or other data provided by dealer 201, as well information from other exchange computer system 100 modules regarding currency A futures contracts and futures contract options trades. Engine 205 might receive these prices as they are calculated by module 145.

In step 400, engine 205 receives data indicating that a customer would like to accept a posted bid or offer for currency A. For example, engine 205 may also generate a trading interface that can be accessed by customer (such as customer 202) using customer spot trade software (such as software 207). That trading interface could be, e.g., a web page and customer spot trade software 207 could be a web browser. The trading interface may display a currency A bid price and a currency A offer price, together with other data (e.g., limits on amounts of currency A that dealer 201 will buy or sell). The interface may further indicate that a customer selection of that bid or that offer does not become a binding transaction until it is confirmed by engine 205. As explained below, that confirmation may be sent by engine 205 at the end of the FIG. 4 method. When the customer initially selects a currency A bid or offer, that selection may generate the indication received in step 400.

In step 405, and in response to the indication of step 400, engine 205 transmits spot trade data to module 145. This transmitted data, which may be the data received in step 300 of FIG. 3, indicates that there is a pending spot market transaction for currency A and requests permission to complete that transaction. The transmitted data may include the size of the pending transaction, e.g., quantity of currency A that dealer 201 will buy or sell if the transaction is executed.

In step 410, engine 205 receives data from module 145 in response to the data transmitted in step 405. This data may be the data transmitted in step 320 or step 335 of FIG. 3. If the received data authorizes the pending transaction (e.g., is data transmitted in step 320 of FIG. 3), engine 205 proceeds on the "yes" branch to block 415. In block 415, and in response to the received authorization, engine 205 generates an indication confirming the customer selection of the currency A bid or offer. Engine 205 also generates and sends data to module 145 indicating that the spot transaction has been completed. If the data received in step 415 includes details of hedging transactions (e.g., if the pending spot transaction is over a size limit dealer set by dealer 201 or will result in a net long or short position over a limit established by dealer 201), details of the hedging transactions are stored. From step 415, the method of FIG. 4 ends.

If the data received in step 410 indicated the pending spot market transaction is not authorized, engine 205 proceeds to step 420 on the "no" branch from step 410. In step 420, engine 205 determines if the pending spot market transaction may proceed in the absence of authorization (and thus, without desired hedging transactions). In some embodiments, engine 205 may send a message to a human operator (e.g., a dealer 201 employee) indicating that desired hedging is not available, and asking if the transaction should still proceed. For example, the operator might determine that the hedging requirements are too stringent, and that the pending spot transaction should proceed while those hedging requirements are revised.

If engine 205 determines in step 420 that the pending transaction should still proceed (e.g., if the operator overrode the rejection received from module 145), the method proceeds to step 415 on the "yes" branch. If engine 205 determines in step 420 that the transaction should not proceed, engine 205 proceeds to step 425 on the "no" branch. In step 425, engine 205 rejects the pending transaction. As part of this rejection, engine 205 may send a communication to the customer spot trading software indicating that the customer's acceptance of the currency A bid or offer cannot be confirmed. From block 425, the method ends.

As indicated above, the operations of FIG. 3 can be performed in conjunction with performance of the operations of FIG. 4. Accordingly, FIGS. 3 and 4 can be treated as showing two separate methods or as two parts of a single method. The method(s) of FIGS. 3 and 4 merely represent some embodiments. Other embodiments include numerous variations in which operations shown in FIGS. 3 and 4 are modified, deleted, replaced, reordered, performed by a different element, and/or otherwise modified.

Figure 5:
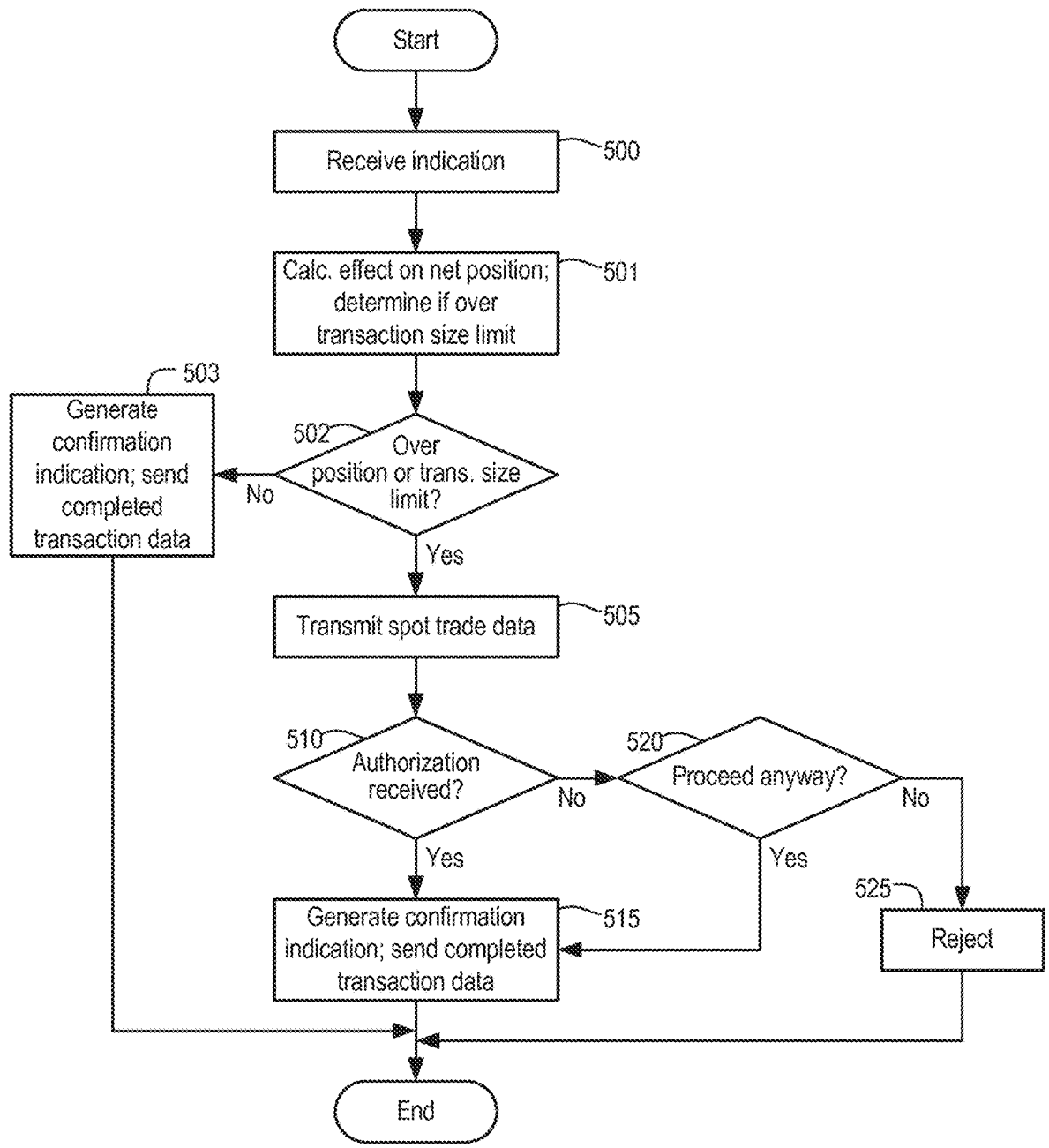
FIG. 5 is a flow chart showing operations performed by a spot trading engine according to additional embodiments.

In some embodiments, engine 205 may not send data to engine 145 requesting approval of a pending trade unless certain conditions are satisfied. FIG. 5 is a flow chart showing steps of a method according to some such embodiments. Steps 500, 505, 510, 515, 520 and 525 are substantially the same as steps 400, 405, 410, 415, 420 and 425, respectively. However, the method of FIG. 5 includes three additional steps 501, 502 and 503. In step 501, and in response to receiving an indication in step 500, engine 205 determines if the pending spot market transaction is above a size limit (e.g., the same size limit provided to module 145 in the currency A configuration data) or if completion of the transaction will cause dealer 201 to have a net currency A spot market position that is above a net position limit (e.g., the same net long limit or same net short limit provided to module 145 in the currency A configuration data). Engine 205 then proceeds to step 502. If the pending transaction is over the transaction size limit or if completing the transaction will cause dealer 201 to have a net currency A spot market position that is above a net position limit, engine 205 proceeds to step 505 on the "yes" branch. Otherwise, engine 205 proceeds to step 503 on the "no" branch. In step 503, engine 205 generates an indication confirming the customer selection of the currency A bid or offer. Engine 205 also generates and sends data to module 145 indicating that the spot transaction has been completed. From block 503, the method ends.

In some embodiments, a dealer's configuration data could provide for a "stepped" or "tiered" hedging approach. For example, if the dealer's net long (or short) spot market position is below a first level, no hedging may be required. When the dealer's net position exceeds the first level, hedging transactions may be performed so as to obtain a first hedging position. Afterwards, and as long as the dealer's net spot market position does not exceed a second level (higher than the first level), no additional hedging is needed. When the dealer's net spot market position exceeds the second level, additional hedging transactions may be performed to obtain a second hedging position. Afterwards, and as long as the dealer's net spot market position does not exceed a third level (higher than the second level), no additional hedging is needed. This pattern could then continue for additional net position limits and corresponding additional hedging positions.

In some embodiments, a dealer's configuration data could provide for hedging of all spot market transactions.

In some embodiments, module 145 may not automatically generate orders for hedging transactions when a pending spot market transaction is over a size limit or will result in a net position over a size limit. Instead, module 145 might send data to engine 205 asking if hedging should be performed. If an affirmative response is received, module 145 could proceed with hedging.

Figure 6:
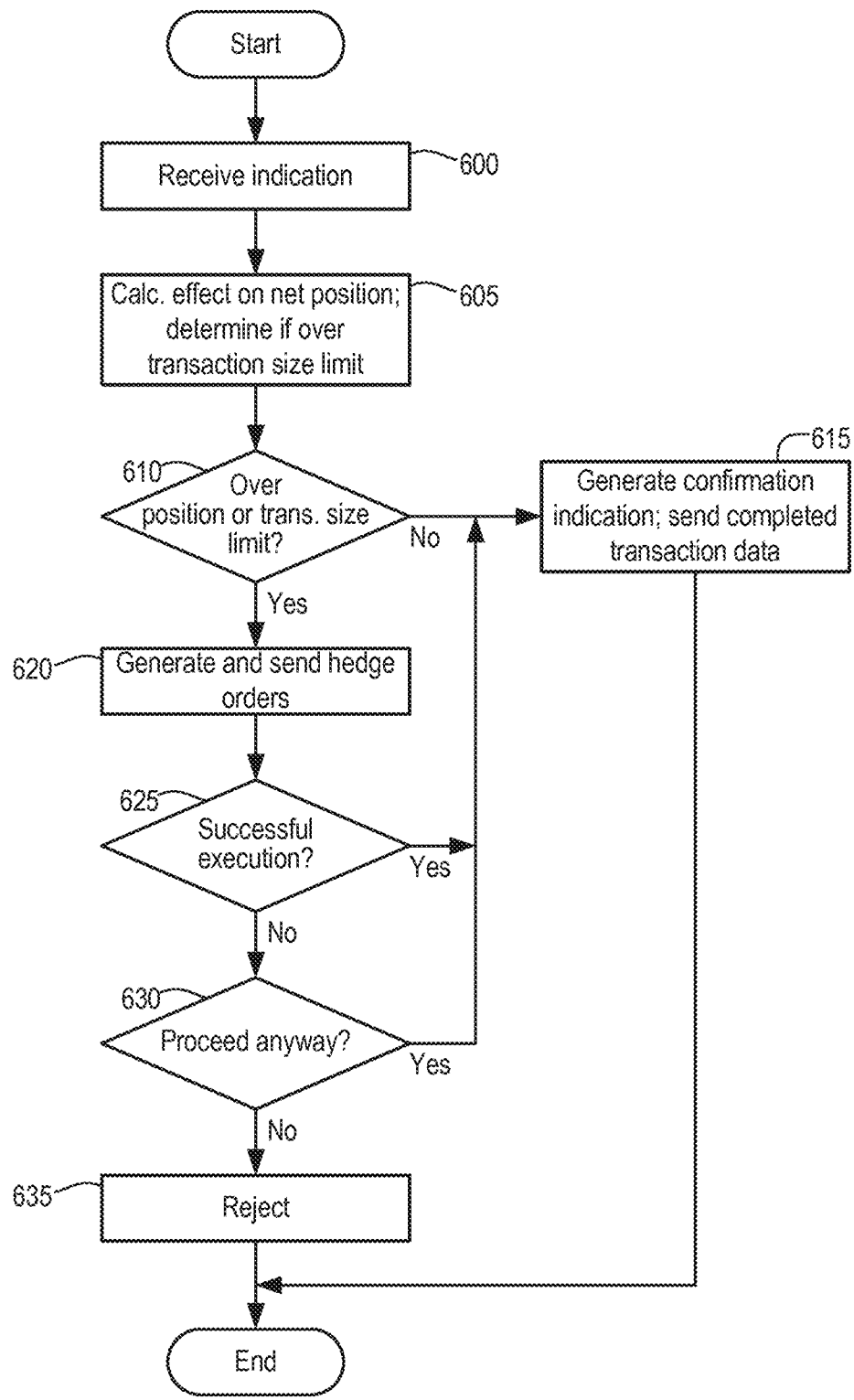
FIG. 6 is a flow chart showing operations performed by a spot trading engine according to further embodiments.

In some embodiments, various steps of FIG. 3 could be performed by engine 205. FIG. 6 is a flow chart showing steps of a method according to some such embodiments. In the method of FIG. 6, configuration data may include the same types of data as in previous embodiments (e.g., data requirements, limits and hedging instructions associated with currency A). However, all of that configuration data may not be sent to module 145. For example, and as described below, the limits and hedging instructions will be used by engine 205.

In step 600, and similar to step 400 of FIG. 4, engine 205 receives an indication that a customer would like to accept a posted bid or offer for currency A. In step 605, and similar to step 501 of FIG. 5, engine 205 determines if the pending spot market transaction is above a size limit (e.g., a transaction size limit in the currency A configuration data) or if completion of the transaction will cause dealer 201 to have a net currency A spot market position that is above a net position limit (e.g., a net long limit or a net short limit in the currency A configuration data).

In step 610, and similar to step 502 of FIG. 5, engine 205 takes action based on the determination of step 605. If the pending transaction is over the transaction size limit or if completing the transaction will cause dealer 201 to have a net currency A spot market position that is above a net position limit, engine 205 proceeds to step 620 on the "yes" branch. Otherwise, engine 205 proceeds to step 615 on the "no" branch. In step 615, and similar to step 503 of FIG. 5, engine 205 generates an indication confirming the customer selection of the currency A bid or offer. Unlike step 503 of FIG. 5, however, engine 205 may not generate and send data to module 145 indicating that the spot transaction has been completed. From block 615, the method ends.

If engine 205 proceeded on the "yes" branch from step 610, in step 620 engine 205 accesses the hedging instructions in the currency A configuration data and identifies one or more currency A futures contracts and/or futures contract options that will result in the hedging position specified in the configuration data. Engine 205 then generates orders for one or more appropriate futures contracts and/or futures contract options and sends those orders to module 145. In block 625, engine 205 determines if the order(s) sent in step 620 resulted in successful execution of the needed transactions. If so, engine 205 proceeds to step 615 on the "yes" branch from step 625. If not, engine 205 proceeds on the "no" branch to step 630.

In step 630, and similar to step 420 of FIG. 4, engine 205 determines if the pending spot market transaction may proceed without the desired hedging position. If so, engine 205 proceeds to step 615 on the "yes" branch. If engine 205 determines in step 630 that the transaction should not proceed, engine 205 proceeds to step 635 on the "no" branch. In step 635, engine 205 rejects the pending spot market transaction. As part of the this rejection, engine 205 may send a communication to the customer spot trading software indicating that the customer's acceptance of the currency A bid or offer cannot be confirmed. From block 635, the method ends.

As can be appreciated from the foregoing, various embodiments provide methods in which spot market bid and/or offer prices of a spot market dealer are contingent upon successful achievement of a futures hedging position. Specifically, and as described above, certain embodiments include methods in which a spot market dealer may post bid and offer prices calculated by the dealer from futures trading data, but where the dealer may not complete a spot market transaction at such a price if a desired futures hedging position cannot first be achieved. In methods according to some embodiments, after rejecting (or receiving a rejection) of a pending spot market transaction based on inability to achieve a desired hedging position, a spot market dealer may then revise its spot market pricing and/or the size of spot market transactions (e.g., reduce the quantity of a subject matter that the dealer is willing to buy or sell in a single transaction and/or in the aggregate).

Method(s) similar to those of FIGS. 3 and 4 and other embodiments could be performed in systems having differing topologies. As one example, a spot market dealer might also be an FCM and/or a CM, and features of spot trade engine 205 could be incorporated into a futures trade engine such as engine 206.

Although certain embodiments are described above by reference to spot market trading in a foreign currency, these methods and those of other embodiments are also applicable to spot market trading in other subject matters.

Conclusion. The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that the steps illustrated in the illustrative figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

What is claimed is:

1. A method of distributing operations for a plurality of instruments using threading, the method comprising:
   receiving, at an exchange computer system data indicating a pending spot market transaction for a respective instrument of the plurality of instruments;
   accessing, by the exchange computer system, for each instrument of the plurality of instruments, using a respective thread of a plurality of threads, data identifying a limit associated with spot trading in each instrument;
   determining, by the exchange computer system using the respective thread for the respective instrument, whether completion of the pending spot market transaction would exceed the limit for the respective instrument;
   accessing, by the exchange computer system, data identifying a futures position corresponding to the limit;
   as a result of determining that the limit would be exceeded, identifying one or more futures transactions that will create the futures position;
   as a result of determining that the limit would be exceeded, generating and transmitting one or more orders associated with the identified one or more futures transactions;
   determining, by the exchange computer system, that the transmitted one or more orders have created the futures position; and
   as a result of determining that the transmitted one or more orders have created the futures position, transmitting, by the exchange computer system, data to a spot trading computer system authorizing completion of the pending spot market transaction.

2. The method of claim 1, wherein the exchange computer system is configured to perform operations of an exchange for trading in the plurality of instruments, the plurality of instruments comprising futures contracts, options in the futures contracts, or both the futures contracts and the options in the futures contracts.

3. The method of claim 1, wherein the limit comprises:
   a first size limit for individual transactions; and
   a second size limit associated with at least one of a net long or net short position in the spot market for the respective instrument.

4. The method of claim 1, wherein the data indicating the pending spot market transaction is received from a spot trading computer system external to the exchange computer system.

5. The method of claim 4, further comprising transmitting, by the exchange computer system to the spot trading computer system, and at repeated intervals, pricing data for the plurality of instruments.

6. The method of claim 1, further comprising:
   receiving, at the exchange computer system, data indicating a second pending spot market transaction for the respective instrument of the plurality of instruments;

determining, by the exchange computer system that the limit for the respective instrument would not be exceeded by completion of the second pending spot market transaction; and as a result of determining that the limit would not be exceeded, transmitting, by the exchange computer system, data authorizing completion of the second pending spot market transaction.

7. One or more non-transitory computer-readable media storing computer executable instructions that, when executed, cause an exchange computer system to perform operations for a plurality of instruments that include:

receiving data indicating a pending spot market transaction for a respective instrument of the plurality of instruments;

accessing, for each instrument of the plurality of instruments, using a respective thread of a plurality of threads, data identifying a limit associated with spot trading in each instrument;

determining, using the respective thread for the respective instrument, whether completion of the pending spot market transaction would exceed the limit for the respective instrument;

accessing data identifying a futures position corresponding to the limit;

as a result of determining that the limit would be exceeded, identifying one or more futures transactions that will create the futures position;

as a result of determining that the limit would be exceeded, generating and transmitting one or more orders associated with the identified one or more futures transactions;

determining that the transmitted one or more orders have created the futures position; and as a result of determining that the transmitted one or more orders have created the futures position, transmitting data to a spot trading computer system authorizing completion of the pending spot market transaction.

8. The one or more non-transitory computer-readable media of claim 7, wherein the exchange computer system is configured to perform operations of an exchange for trading in the plurality of instruments, the plurality of instruments comprising futures contracts, options in the futures contracts, or both the futures contracts and the options in the futures contracts.

9. The one or more non-transitory computer-readable media of claim 7, wherein the limit comprises:

a first size limit for individual transactions; and a second size limit associated with at least one of a net long or net short position in the spot market for the respective instrument.

10. The one or more non-transitory computer-readable media of claim 7, wherein the data indicating the pending spot market transaction is received from a spot trading computer system external to the exchange computer system.

11. The one or more non-transitory computer-readable media of claim 7, wherein the stored instructions further comprise instructions that, when executed, cause the exchange computer system to perform operations that include transmitting, at repeated intervals, pricing data for the plurality of instruments.

12. The one or more non-transitory computer-readable media of claim 7, wherein the stored instructions further comprise instructions that, when executed, cause the exchange computer system to perform operations that include:

receiving data indicating a second pending spot market transaction for the respective instrument of the plurality of instruments;

determining that the limit for the respective instrument would not be exceeded by completion of the second pending spot market transaction; and as a result of determining that the limit would not be exceeded, transmitting data authorizing completion of the second pending spot market transaction.

13. An exchange computer system configured to distribute operations for a plurality of instruments using threading, the exchange computer system comprising:

at least one processor; and at least one non-transitory memory, wherein the exchange computer system is configured to perform operations of an exchange for the plurality of instruments, and wherein the at least one non-transitory memory stores instructions that, when executed by the at least one processor, cause the at least one processor to perform operations that include— receiving, from a spot trading computer system external to the exchange computer system, data indicating a pending spot market transaction for a respective instrument of the plurality of instruments, accessing, for each instrument of the plurality of instruments, using a respective thread of a plurality of threads, data identifying a limit associated with spot trading in each instrument, determining, using the respective thread for the respective instrument, whether completion of the pending spot market transaction would exceed the limit for the respective instrument, accessing data identifying a futures position corresponding to the limit, as a result of determining that the limit would be exceeded, identifying one or more futures transactions that will create the futures position, as a result of determining that the limit would be exceeded, generating and transmitting one or more orders associated with the identified one or more futures transactions, determining that the transmitted one or more orders have created the futures position, and as a result of determining that the transmitted one or more orders have created the futures position, transmitting data to the spot trading computer system authorizing completion of the pending spot market transaction.

14. The exchange computer system of claim 13, wherein the exchange computer system is configured to perform operations of an exchange for trading in the plurality of instruments, the plurality of instruments comprising futures contracts, options in the futures contracts, or both the futures contracts and the options in the futures contracts.

15. The exchange computer system of claim 13, wherein the limit comprises:

a first size limit for individual transactions; and a second size limit associated with at least one of a net long or net short position in the spot market for the respective instrument.

16. The exchange computer system of claim 13, wherein the data indicating the pending spot market transaction is received from a spot trading computer system external to the exchange computer system.

17. The exchange computer system of claim 13, wherein the at least one non-transitory memory stores instructions that, when executed, cause the computer system to perform operations that include transmitting, at repeated intervals, pricing data for the plurality of instruments.

18. The exchange computer system of claim 13, wherein the at least one non-transitory memory stores instructions that, when executed, cause the at least one processor to perform operations that include:
- receiving data indicating a second pending spot market transaction for the respective instrument of the plurality of instruments;
- determining that the limit for the respective instrument would not be exceeded by completion of the second pending spot market transaction; and
- as a result of determining that the limit would not be exceeded, transmitting data authorizing completion of the second pending spot market transaction.

* * * * *